United States Patent Office 3,549,390
Patented Dec. 22, 1970

3,549,390
MILK-CLOTTING ENZYME PRODUCT
AND PROCESS THEREFOR
Robert Lemoyne Charles, Donald Paul Gertzman, and Nicholas Melachouris, Elkhart, Ind., assignors to Miles Laboratories, Inc., Elkhart, Ind., a corporation of Indiana
No Drawing. Filed Sept. 9, 1968, Ser. No. 758,568
Int. Cl. A23c 19/02; C07g 7/026
U.S. Cl. 99—116                                3 Claims

ABSTRACT OF THE DISCLOSURE

A novel milk-clotting enzyme product having a desirably high ratio of clotting activity to proteolytic activity can be prepared by growing under aerobic conditions a culture of *Mucor miehei* NRRL 3420 or mutants thereof in a medium containing appropriate nutrients and then recovering the enzyme therefrom. The resulting enzyme prduct can be used to coagulate milk in a cheesemaking process.

BACKGROUND AND DISCUSSION OF PRIOR ART

In the generally practiced art of cheesemaking, milk is clotted or coagulated to form a curd, the curd is cut into multiple pieces and the pieces are collectively cooked. The liquid whey is separated from the cooked curd, which is then cut into blocks, pressed, and cured for several months to form the desired cheese product. The agent usually employed in the art to produce the curd by clotting or coagulation of milk is the enzyme rennin found in calf rennet.

Calf rennet is a material prepared from the lining membrane of the fourth stomach of unweaned calves. It can be readily appreciated that the quality and quantity of rennet available for cheesemaking is thus directly dependent upon the number and kind of calves which are being slaughtered for food purposes. This has prompted many attempts in the prior art to develop a suitable substitute for calf rennet. It has been suggested in the prior art that various vegetable and microbial enzyme preparations could be used for milk-clotting. While several enzyme preparations have been tried which have desired milk-clotting characteristics, for the most part these enzymes are not commercially useful. They have such a high proteolytic activity that they tend to dissolve the milk curd which they have produced. They also impart a bitter flavor to cheese prepared from curd which they produce. The prior art microbial enzymes also have the disadvantage that they have been generally of low milk-clotting potency.

An advance in the art was previously made through the use of *Mucor miehei* strain Ka3111 deposited at Centraalbureau voor Schimmelcultures, Baarn, Holland under the number CBS 370.65. This organism, when grown on a suitable medium, produces a microbial rennin which may have commercial utility in the production of cheese.

DESCRIPTION OF THE INVENTION

It has now been found that a superior milk-clotting enzyme can be prepared by growing under aerobic conditions a culture of *Mucor miehei* NRRL 3420 or mutants thereof in a medium containing appropriate nutrients and then recovering the enzyme therefrom. This enzyme has a desirably high ratio of clotting activity to proteolytic activity and can be employed under usual calf rennet milk-clotting conditions to produce cheese of good flavor and having desirable body and texture.

The organism useful in the present invention was isolated from dried sediments from a sewage disposal plant and is classified as *Mucor mechei* according to well known procedures. The particular strain of *Mucor miehei* useful in the production of the novel milk-clotting enzyme has been deposited with the Northern Utilization Research Branch, Agricultural Research Service of the United States Department of Agriculture, Peoria, Ill. and has been given the identification number NRRL 3420. This culture is available to the public without restriction.

This strain has the following characteristics:

CULTURE MEDIUM

| Colony characteristic | YPSS agar | Sabouraud dextrose agar | Molasses agar | Bread |
|---|---|---|---|---|
| Felt: | | | | |
| Depth | 1-3 mm | 0.1-1 mm | 1-2 mm | 1-2.5 mm. |
| Color | Dark gray | Hyaline | Dark gray | Dark gray. |
| Odor | None | Breadlike | None | None. |
| Sporangiospores: | | | | |
| Septation | At base of branch | At base of branch | At base of branch | At base of branch. |
| Markings | None | None | None | None. |
| Length | 1-3 mm | 1-3 mm | 1-2 mm | 1-2 mm. |
| Diameter | 5-9$\mu$ | 5-9$\mu$ | 5-9$\mu$ | 5-9$\mu$. |
| Color | Hyaline | Hyaline | Hyaline | Hyaline to brown. |
| Sporangia: | | | | |
| Color | Yellow brown | Yellow brown | Yellow brown | Yellow brown. |
| Spore Discharge | | (Masses all break off) | | |
| Size | 60-100$\mu$ | 60-100$\mu$ | 60-100$\mu$ | 60-100$\mu$. |
| Shape | Round | Round | Round | Round. |
| Columella: | | | | |
| Shape | Obovate or round | Round to obovate | Round to obovate | Round to obovate. |
| Color | Hyaline | Hyaline | Hyaline | Hyaline to yellow. |
| Markings | Warty top | Warty top | Warty top | Warty top. |
| Sporangiospores: | | | | |
| Size | 3.5-6$\mu$ | 3.5-6$\mu$ | 3.5-6$\mu$ | 3.5-6$\mu$. |
| Shape | Oval to spheric | Oval to spheric | Oval to spheric | Oval to spheric. |
| Chlamydospores | None | None | None | None. |
| Zygospores | Present | do | do | Do. |
| Shape | Round to oval | | | |
| Size | 20$\mu$×20$\mu$ | | | |
|  | 30$\mu$×30$\mu$ | | | |
| Color | Brown | | | |
| Suspensor: | | | | |
| Color | Hyaline | | | |
| Markings | None | | | |
| Diameter | 7.5$\mu$ | | | |
| Relative size | Equal | | | |

It should be understood that the process of the present invention is not limited solely to the use of *Mucor miehei* NRRL 3420 but the natural and artificial mutants of *Mucor miehei* NRRL 3420 can also be employed. Such mutants can be obtained by well known techniques such as X-ray and ultraviolet irradiation.

The *Mucor miehei* NRRL 3420 organism is maintained on agar slants and can be grown in a medium containing sources of carbohydrates and nitrogen. Preferably the medium also contains inorganic salts. Illustrative carbohydrates are corn starch, dextrose, lactose, milk solids, wheat bran and the like. Illustrative nitrogen sources are soy meal, protein-containing materials, amino acids, diammonium phosphate, yeast extract, sodium caseinate and the like. Illustrative inorganic salts are calcium carbonate, sodium sulfate, diammonium phosphate, zinc acetate and the like. These carbohydrates, nitrogen sources and inorganic salts are well known in the art. It is preferable that the medium contain ground corn as a source of some of the carbohydrates, nitrogen and inorganic salts.

The organism preferably is grown under submerged fermentation conditions for about 2 to about 7 days at a temperature of from about 30° C. to about 50° C. At temperatures below about 30° C. the yield of desired enzyme is too low to be economically practical, while at temperatures above about 50° C. the desired enzyme becomes inactivated. The preferred growth temperature is from about 35° C. to about 40° C. Atmospheric pressure conditions are preferably employed, but pressures above and below atmospheric can be used if desired with no particular advantages or disadvantages.

The desired milk-clotting enzyme of the present invention is present in the beer outside the mycelium and can be recovered in the preferred liquid form by simply filtering off the mycelium from the fermentation beer and retaining the filtrate. The resulting liquid enzyme has storage stability comparable to that of prior art calf rennet. The enzyme can be recovered in a powdered form, if desired, by well known enzyme recovery techniques. Such powdered enzyme is also storage stable. The filtrate can be frozen and dried from the frozen state using known freeze-drying techniques. The fermentation beer filtrate could alternatively be treated with ethanol to precipitate the enzyme. The precipitated enzyme is then washed with ethanol and vacuum dried at room temperature. Acetone or other organic solvents as well as ammonium sulfate can also be used to precipitate the enzyme from an aqueous solution.

The novel milk-clotting enzyme prepared according to the above described process has good activity with respect to clotting milk while also having a low level of proteolytic activity. It thus does not appreciably attack or soften the curd formed during milk-clotting. This novel enzyme can be employed under usual calf rennet milk-clotting conditions and it is therefore adaptable to presently practiced cheesemaking operations. It can be used in place of all or part of the calf rennet in standard cheesemaking. Cheese trials have shown that cheese made from curd produced by the *Mucor miehei* NRRL 3420 milk-clotting enzyme, even after an extended curing period, exhibits desirable flavor and freedom from bitterness. This is highly unique because most prior art microbial milk-clotting enzymes have had proteolytic characteristics which produced bitterness in the cheese either immediately or on short curing.

The milk-clotting enzyme produced by the present process is assayed for milk-clotting activity in the following manner. A 10 percent (weight/volume basis) aqueous solution is prepared by dissolving the appropriate amount of non-fat dry milk solids in water. To this solution is then added $CaCl_2 \cdot 2H_2O$ to produce a concentration of 0.01 M calcium. A 5 ml. portion of the above milk solution is placed in a test tube and heated to 37.5° C. A 0.5 ml. portion of aqueous diluted enzyme at 37.5° C. is then added to the milk solution in the test tube. The enzyme-milk solution mixture is then agitated and the time to form the first clot is measured. The enzyme concentration is selected so that clotting time will be about 4 minutes. The milk-clotting activity of the enzyme is calculated as follows:

$$\text{Soxhlet Units} = \frac{M \text{ (ml.)}}{E \text{ (mg.)}} \times \frac{2400 \text{ (sec.)}}{T \text{ (sec.)}} \times 1000$$

M=milk volume
E=enzyme weight
T=time until first clot forms.

The enzyme activity is then expressed in Soxhlet units (SU) per gram. When the enzyme is originally employed in a liquid form, rather than dissolving powdered enzyme in water, the appropriate volume in microliters E is used in the above formula, and the enzyme activity is expressed as Soxhlet units per milliliter. A Soxhlet unit is the amount of enzyme activity that can clot 1 ml. of the above milk solution in 40 min.

The milk-clotting enzyme is assayed for proteolytic activity in the following manner. A 1 percent (weight/volume basis) aqueous solution is prepared by dissolving the appropriate amount of casein in water. To this solution is then added NaCl to produce a concentration of 0.1 M sodium. A 15 ml. portion of the above solution is placed in a test tube and heated to 37.5° C. A 7 ml. portion of enzyme solution at 37.5° C. is then added to the casein solution in the test tube. The enzyme-casein solution mixture is then incubated at 37.5° C. for exactly 30 minutes. A 22 ml. portion of a 24 percent (weight/volume basis) aqueous solution of trichloroacetic acid is then added to the test tube to stop the reaction by inactivating the enzyme. The resulting mixture is allowed to stand at room temperature for 20 minutes and is then filtered through Whatman No. 42 filter paper. The ultraviolet absorption of the resulting filtrate is then measured at a source wavelength of 280 millimicrons. A blank is prepared by adding 22 ml. of the 24 percent aqueous trichloroacetic acid solution to 7 ml. of the enzyme solution being tested and then adding 15 ml. of the 1 percent aqueous casein solution to the mixture at 37.5° C. The ultraviolet absorption of the blank is then measured at 280 millimicrons. The enzyme concentration is selected so that the ultraviolet absorption at 280 millimicrons of the above reaction solution will be in the range of 0.005–0.700. The proteolytic activity of the enzyme is calculated as follows:

$$C_i = \frac{A_{280} - 0.004571}{6.58589}$$

Proteolytic units $= C_i \times 1000$ $$\text{Specific activity} = \frac{\text{Proteolytic units} \times 1000}{B}$$

$C_i$=Tyrosine concentration (mg./ml.)
$A_{280}$=Absorption at 280 millimicrons
E=Amount of enzyme used (mg.).

The proteolytic units for the blank are subtracted from those of the sample before calculating the specific activity of the sample which is expressed in Proteolytic units (PU) per gram. When the enzyme is originally employed in a liquid form, rather than dissolving powdered enzyme in water, the appropriate volume in microliters E is used in the above formula, and the enzyme activity is expressed as Proteolytic units per milliliter. A Proteolytic unit is the amount of enzyme activity that can liberate in 1 percent casein solution 1 microgram of material calculated as tyrosine per milliliter of filtrate in 30 minutes.

The invention will be described in further detail in the following examples.

Example 1

A culture of *Mucor miehei* NRRL 3420 was transferred to several 1 liter Erlenmeyer flasks each containing a sterilized medium consisting of 10 g. corn starch, 12.5 g. ground corn, 7.5 g. soy meal, 1.25 g. calcium carbonate and 250 ml. water. This medium also contained 100 mg. bacterial amylase to liquefy the starchy components of the medium. The inoculated flask contents were then shaken in a reciprocal motion shaker with a 2 in. stroke at 176 strokes per minute for six days while maintained at a temperature of 32.5° C. The resulting fermentation beer was then filtered from the mycelium and the combined filtrate from all the flasks was assayed to contain enzyme activity of 1233 Soxhlet units per ml. A portion of the filtrate was frozen and dried from the frozen state according to well known procedures. The dried powder was assayed to contain 114,823 Soxhlet units per gram and 727 Proteolytic units per gram. The ratio of Soxhlet units to Proteolytic units was 157.9.

An enzyme prepared in the above manner was then used to make cheese. A 240 lb. quantity of pasteurized whole milk was placed in a cheese vat and heated to 88° F. (31° C.). A 2.4 lb. quantity of lactic acid starter culture was then added to the milk. After an hour a quantity of the above prepared liquid enzyme filtrate containing a total enzyme potency of about 800,000 Soxhlet units was added to the milk in the cheese vat. The milk clotted, and a satisfactory curd was prepared in 28 minutes. It was then cut into desired shapes and heated to 102° F. (39° C.). The whey was drained off and the usual steps of cheddaring, milling, salting and hooping were carried out to obtain green cheese. A control cheese was prepared at the same time using a prior art calf rennet under similar conditions. The cutting quality of the curd and the texture of the green cheese prepared from the microbial enzyme of the present invention were found to be comparable with those prepared from calf rennet. The cheeses were ripened at 45° F. (7° C.) and 90 percent relative humidity for 60 days. The organoleptic evaluations, such as smelling, tasting, breaking and the like, indicated that the cheese made from the microbial enzyme had normal body and texture and normal pleasing flavor completely free of any bitterness, rancidity or other off flavors and was substantially the same as that produced from calf rennet.

Example 2

A culture of *Mucor miehei* NRRL 3420 was transferred to several 2800 ml. Fernbach flasks each containing a sterilized medium consisting of 10 g. corn starch, 12.5 g. ground corn, 6.0 g. of an amino acid-containing material marketed by Cudahy Packing Co. under the trade name Peptone T, 0.25 g. sodium sulfate and 250 ml. water. This medium also contained 100 mg. of bacterial amylase to liquefy the starchy materials. The inoculated flask contents were then shaken in a reciprocal motion shaker with a 2 in. stroke at 176 strokes per minute for seven days while maintained at a temperature of 37° C. The resulting fermentation beer was filtered from the mycelium and the combined filtrate from all the flasks was assayed to contain 2290 Soxhlet units per ml. A portion of the filtrate was frozen and dried from the frozen state according to well known procedures. The dried powder was assayed to contain 226,585 Soxhlet units per gram and 1339 Proteolytic units per gram. The ratio of Soxhlet units to Proteolytic units was 169.2. The above-produced enzyme can then be used to clot milk in a cheese-making process.

Example 3

A culture of *Mucor miehei* NRRL 3420 was transferred to several 2800 ml. Fernbach flasks each containing a sterilized medium consisting of 8.0 g. dextrose monohydrate, 12.5 g. ground corn, 5.0 g. Peptone T and 250 ml. water. The inoculated flask contents were then shaken in a reciprocal motion shaker with a 3 in. stroke at 176 strokes per minute for seven days while maintained at a temperature of 32° C. The resulting fermentation beer was filtered from the mycelium and the combined filtrate from all the flasks was assayed to contain 2400 Soxhlet units per ml. The filtrate was then lyophilized and the resulting powder was assayed to contain 298,804 Soxhlet units per gram and 2321 Proteolytic units per gram. The ratio of Soxhlet units to Proteolytic units was 128.7. The above-produced enzyme can then be used to clot milk in a cheese-making process.

The enzyme produced in accordance with the present invention has a higher ratio of milk clotting activity to proteolytic activity than any other microbial rennin known to us. Two separate batches of enzyme believed to have been produced from the prior art *Mucor miehei* strain Ka 3111 mentioned above had the following properties:

|  | Clotting activity SU/g. | Proteolytic activity PU/g. | SU/g./ PU/g. |
|---|---|---|---|
| Strain Ka 3111 Batch: |  |  |  |
| 1 | 295,200 | 3,348 | 88.2 |
| 2 | 304,180 | 3,126 | 97.3 |

An enzyme produced from prior art *Mucor miehei* strain University of California 21 contained 28,846 Soxhlet units per gram and 433 proteolytic units per gram for a *SU/PU* ratio of 66.6. This material produced cheese having an undesirably rancid flavor.

Since the amount of a given milk-clotting enzyme to be used in a cheesemaking process is generally directly related to its clotting activity, for a given level of clotting activity these prior art enzymes will supply a significantly higher amount of proteolytic activity than is present in the enzyme of the present invention. This higher proteolytic activity of the prior art enzymes will tend to form unsatisfactory curd and undesirably bitter flavor in the finished cheese. In contrast to this, the higher activity ratio of the enzyme of the present invention enables satisfactory cheese to be made which is comparable to that produced through the use of natural calf rennet.

In summary, this invention relates to a novel milk-clotting enzyme, to a process for producing this enzyme from *Mucor miehei* NRRL 3420 and mutants thereof, and to a process for cheesemaking employing the novel enzyme.

What is claimed is:

1. A milk-clotting enzyme obtained from *Mucor miehei* NRRL 3420 or mutants thereof having a desirably high ratio of clotting activity to proteolytic activity and which can be employed under usual rennet-clotting conditions to produce cheese of good flavor and having desirable body and texture.

2. A process for the production of a milk-clotting enzyme comprising growing under aerobic conditions a culture of *Mucor miehei* NRRL 3420 or mutants thereof in a medium containing appropriate nutrients and then recovering the enzyme therefrom.

3. In a process for making cheese including the step of preparing curds from milk by contacting the milk with a milk-clotting enzyme, the improvement which comprises employing as the milk-clotting enzyme the enzyme of claim 1.

References Cited

FOREIGN PATENTS 1,108,287  4/1968  Great Britain _____ 195—62

LIONEL M. SHAPIRO, Primary Examiner

U.S. Cl. X.R.

195—62, 66